(No Model.)
J. A. TRAUT.
KEY CHAIN.
No. 431,859.
Patented July 8, 1890.
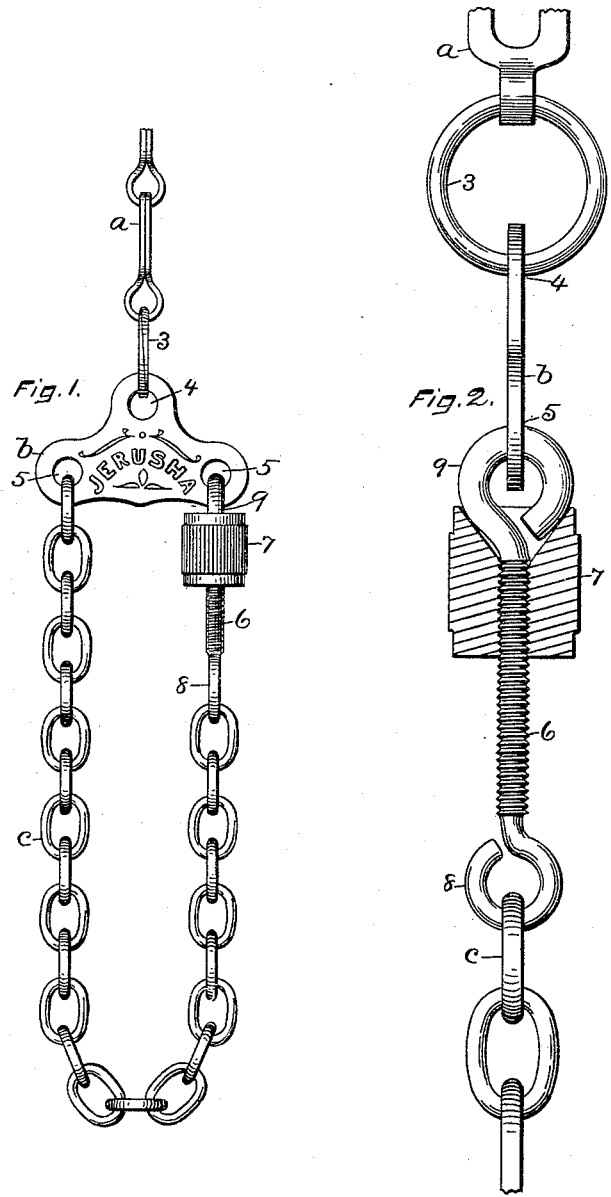
Witnesses.
John Edwards Jr.
F. A. Pelton
Inventor.
Justus A. Traut,
By James Shepard
Atty.

UNITED STATES PATENT OFFICE.

JUSTUS A. TRAUT, OF NEW BRITAIN, CONNECTICUT.

KEY-CHAIN.

SPECIFICATION forming part of Letters Patent No. 431,859, dated July 8, 1890.

Application filed February 20, 1890. Serial No. 341,150. (No model.)

*To all whom it may concern:*

Be it known that I, JUSTUS A. TRAUT, a citizen of the United States, residing at New Britain, in the county of Hartford and State of Connecticut, have invented certain new and useful Improvements in Key-Chains, of which the following is a specification.

My invention relates to improvements in key-chains; and the objects of my improvement are simplicity and cheapness of construction and convenience and general utility in the finished article.

In the accompanying drawings, Figure 1 is a side elevation of the major portion of my key-chain; and Fig. 2 is an enlarged detached view of a portion thereof, partly in section.

The carrying-chain *a*, for securing the keys to the person of the wearer, is or may be of any ordinary construction, and only a portion of said chain is illustrated in the drawings. Said chain is secured by means of a split ring 3 or other suitable fastener to the central eye 4 of the name-plate *b*. This plate may be of any desired contour, but is preferably substantially in the form of a modified triangle—that is, a flattened triangle with rounded corners—and with eyes 5 at each lower corner, by which to secure the two ends of what I term the "ring-chain" *c*, because said chain is the one upon which the keys are to be strung in a manner analogous to stringing them upon a key-ring. By making the name-plate with the three corner eyes 4 5 5 I am enabled to widen it laterally, so that it will serve for a name-plate and permit the name of the wearer to be stamped thereon, as indicated in Fig. 1. I attach and detach one end of the ring-chain *c* to and from the name-plate by means of the link 6 and nut 7. This link is provided with a threaded body and eyes 8 and 9 at its ends, as shown, and is preferably composed of metal which is somewhat elastic, so that the eye 9, which is secured to the name-plate, may spring inwardly under pressure and outwardly when the pressure is released. Said eye 9 is left, when free, open sufficiently to enable it to be hooked upon and detached from the name-plate. The periphery of the nut 7 is knurled to facilitate turning, and the end which faces the eye 9 is chambered out in substantial conformity to the outward flare of the eye 9, whereby when the nut is screwed up against said eye it bears against the opposite sides thereof, as shown in Fig. 2, with a tendency to spring the eye inwardly and partially close the opening therein. The tension exerted on the nut by the eye when thus sprung inwardly will cause sufficient friction to hold the nut in position against accidental displacement in use.

In order to unfasten the ring-chain *c* for the attachment or detachment of another key, it is only necessary to turn the nut back on the threaded body of the link 6 far enough to clear the eye 9, when said link may be unhooked, the desired addition or removal made in the keys, after which the link is replaced and the nut returned to its former position.

While I prefer to form the eye 8 for connecting the link 6 to the ring-chain *c*, it is evident that the same may be connected in any ordinary manner. It is also evident that for the purpose of the general combination of carrying-chain, the peculiar name-plate, ring-chain, and devices for attachably and detachably connecting one end thereof to said name-plate, other fastening devices may be substituted for the link 6 and nut 7.

I claim as my invention—

1. The herein-described key-chain, consisting of the carrying-chain *a*, the name-plate *b*, provided with corner eyes 4 5 5, the key-ring chain *c*, and devices for attachably and detachably connecting one end of said chain with one of said eyes 5, substantially as described, and for the purpose specified.

2. A key-chain having the attaching and detaching link 6, provided with a threaded body and open eye 9 at one end, and the nut 7, secured upon said threaded body and provided with a chambered end for bearing upon said eye and covering the opening therein, substantially as described, and for the purpose specified.

JUSTUS A. TRAUT.

Witnesses:
JAMES SHEPARD,
JOHN EDWARDS, Jr.